United States Patent [19]

Sun et al.

[11] Patent Number: 6,010,538
[45] Date of Patent: Jan. 4, 2000

[54] IN SITU TECHNIQUE FOR MONITORING AND CONTROLLING A PROCESS OF CHEMICAL-MECHANICAL-POLISHING VIA A RADIATIVE COMMUNICATION LINK

[75] Inventors: Mei H. Sun, Los Altos; Herbert E. Litvak, Cupertino; Huey M. Tzeng, San Jose; Daniel E. Glenn, Mountain View; Earl M. Jensen, Sunnyvale; Frank J. Hausman, San Francisco; Lin Jun Zhou, Palo Alto, all of Calif.

[73] Assignee: Luxtron Corporation, Santa Clara, Calif.

[21] Appl. No.: 08/585,164

[22] Filed: Jan. 11, 1996

[51] Int. Cl.$^7$ .............................. H05K 3/04; B24B 7/04
[52] U.S. Cl. .............................. 756/345; 216/84; 216/89; 216/91; 438/8; 438/14; 438/692; 451/6; 451/41; 451/288; 356/357
[58] Field of Search .......................... 156/345 LC, 345 L, 156/345 LP, 626.1; 356/357; 451/6, 41, 287, 288; 216/84, 88, 91; 438/8, 14, 692

[56] References Cited

U.S. PATENT DOCUMENTS

| | | | |
|---|---|---|---|
| 5,190,614 | 3/1993 | Leach et al. | 156/626 |
| 5,308,447 | 5/1994 | Lewis et al. | 156/626 |
| 5,362,969 | 11/1994 | Glenn | 250/561 |
| 5,433,651 | 7/1995 | Lustig et al. | 451/6 |
| 5,461,007 | 10/1995 | Kobayashi et al. | 437/225 |
| 5,483,568 | 1/1996 | Yano et al. | 378/44 |
| 5,685,766 | 11/1997 | Mattingly et al. | 451/36 |
| 5,851,135 | 12/1998 | Sandhu et al. | 451/5 |

FOREIGN PATENT DOCUMENTS

| | | | |
|---|---|---|---|
| WO 93/25893 | 12/1993 | WIPO | G01N 21/88 |
| WO 9407110 | 3/1994 | WIPO | G01B 11/06 |

OTHER PUBLICATIONS

Doody "Three Ships to Mars", Sky & Telescope, p. 24–26, Dec. 1996.
Hawley, "Hubble Revisted", Sky & Telescope, p. 42–47, Feb. 1997.
Von Braun, The Search Begins For Life on Mars, Popular Science, p. 78–81 and 121, Jul 1976.
Gore, What Voyager Saw: Jupiters Dazzling Realm, National Geographic, p. 2–28, Jan. 1980.
Collins, Making Stars to See Stars: Jupiter's DOD Adaptive Optics Work is Declassified, Physics Today, p. 17–21, Feb. 1992.
Chaikin, The Ultimate Time Machine, Popular Science p. 68–72, Mar. 1992.
Translation of Feldmann et al., Multisensor Microsystem for Tool Monitoring p. 52–54, VDI–Zeitshrift, vol. 137 No. 4, Sep. 1993.
Feldmann et al., "Multisensorielles Mikrosystem zur Werkzeugüberwachung beim Drehen, " *VDI–Zeitschrift*, 137 (1995) Sep., No. 4, pp. 52–54, Spezial, Dusseldorf, DE.

*Primary Examiner*—Bernard Codd
*Attorney, Agent, or Firm*—Majestic, Parsons, Siebert & Hsue

[57] ABSTRACT

In an apparatus for removing material from an article, such as an exposed surface of an intermediate integrated circuit structure, by planarizing, polishing, etching or the like, a sensor is mechanically coupled to a moving carrier of the article for directing through the article to its first side an electromagnetic radiation beam having a wavelength band to which the structure is substantially transparent. The beam is detected after interacting with the article, such as being reflected from its exposed surface, and resulting information of the state of the processing of the exposed surface is transmitted from the moving carrier to a stationary receiver by radiation without the use of any physical transmission media such as wires or optical fibers. Multiple sensors mounted on the moving article carrier provide information of the uniformity of the processing across the exposed article surface. The radiation signal received by the stationary receiver is used to monitor or control the processing, such as by determining an endpoint thereof.

44 Claims, 11 Drawing Sheets

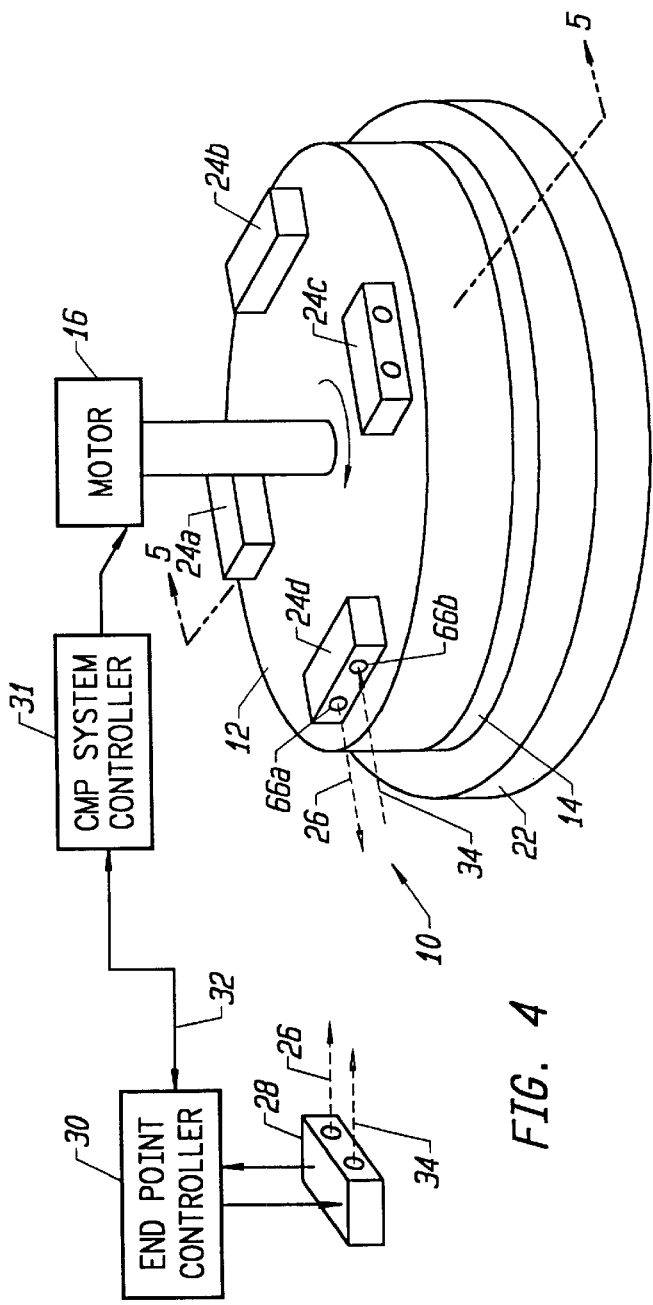
FIG. 4
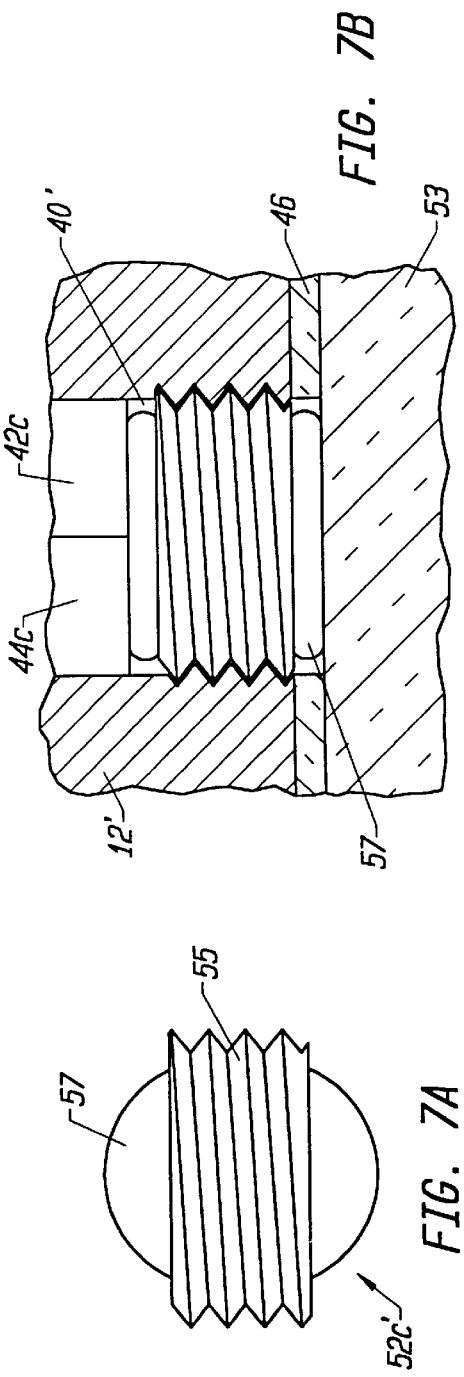
FIG. 7A
FIG. 7B

IN SITU TECHNIQUE FOR MONITORING AND CONTROLLING A PROCESS OF CHEMICAL-MECHANICAL-POLISHING VIA A RADIATIVE COMMUNICATION LINK

CROSS-REFERENCE TO RELATED APPLICATION

This is an improvement in and expansion of the invention described in allowed U.S. patent application Ser. No. 08/122,207 of Herbert E. Litvak, filed Sep. 16, 1993, now U.S. Pat. No. 5,499,733. This earlier application is being expressly incorporated herein by this reference, and is referred to hereinafter as the "Prior Application."

BACKGROUND OF THE INVENTION

This invention relates generally to a method and apparatus for monitoring a process being performed to transform an article in some way, particularly an exposed surface of the article. In a specific form, this invention more particularly relates to a technique for detecting an endpoint of a chemical-mechanical-polishing ("CMP") process on a surface carried by a semiconductor wafer.

CMP, usually resulting in planarization of a surface, is a key technology used for the fabrication of advanced microelectronic devices (e.g. those having critical dimensions that are less than about 0.5 micron) on substrates. Planarization allows smaller features to be fabricated, which leads to denser circuit packing and faster circuit response, which in turn results in faster logic devices and higher capacity memories. In addition, planarized surfaces allow for the fabrication of circuit devices having multiple levels of metallization, and therefore a more sophisticated design. The process consists of mechanically grinding or polishing of the work piece (generally a thin film microelectronic circuit imposed on a silicon wafer) against a rotating polishing wheel (platen), in the presence of a chemical slurry therebetween. The slurry provides both abrasive particles (to accomplish the mechanical grinding) and reactive chemicals (to assist the film removal by chemical modification of the film surface). The wafer is typically held (by frictional forces) to a polishing head or wafer carrier, which itself rotates, and which provides downward pressure of the wafer against the platen. A porous polymeric polishing pad mounted on the platen helps to trap the abrasive slurry particles, and provides a conformable surface that aids in the planarization process.

Process control, and specifically endpoint control, has become a key issue in CMP, in part because of process variations, such as in the above mentioned slurry and polishing pad, and in part because of variations in the thickness, composition, and uniformity of the films to be polished. The Prior Application referenced above is directed to such process control. Briefly, the technique mentioned in the Prior Application requires directing through the back side of the wafer to be polished, an interrogating optical beam having a wavelength to which the wafer is substantially transparent. The state of removal of the film on the front side of the wafer is then inferred from the time evolution of the amount of the interrogating light which is reflected from the film surface. In the case of opaque (e.g. metal) films, a pronounced shift in reflected light intensity often occurs when the film has been completely removed, thus signaling an endpoint of the process. In the case of transparent films (e.g. silicon dioxide), the time evolution generally consists of alternating intensity peaks and valleys caused by the well known effects of thin film optical interference. By analyzing the pattern of peaks and valleys, one can determine the amount of film that has been removed, thus allowing an endpoint of the process to be called when a predetermined amount of film removal has occurred.

Although the techniques described in the Prior Application are quite useful in monitoring and controlling the CMP process, further improvements and implementations of the techniques with actual CMP equipment are desirable. Accordingly, it is a primary object of the present invention to improve the mechanical and electrical connections of the film sensing apparatus, so as to allow ease of installation, replacement, and service.

It is another object of the present invention to provide techniques for monitoring and controlling the CMP process, and to provide a measure of film removal uniformity across the film being treated.

It is a more general object of the present invention to provide techniques for monitoring and controlling various processing steps, in addition to CMP, used in manufacturing integrated circuits, flat panel displays, and the like.

It is yet another object of the present invention to utilize these same techniques for monitoring and controlling the processing of other types of articles as well.

SUMMARY OF THE INVENTION

These and additional objects are accomplished by the various aspects of the present invention, wherein, briefly and generally, an article which moves during its processing is monitored, simultaneously with the process being carried out, by a sensor that is also moving while the sensor transmits signals to a receiver that is not moving with either the sensor or the article and without any wire, optical fiber or other physical transmission media as the communication link between them, the transmitted signal being related to a condition of the article that is being monitored. The sensor interrogates a surface or other portion of the article in a manner appropriate to the condition of the object being monitored, such as by directing electromagnetic radiation (for example "optical" radiation, defined to be that within the visible, ultraviolet or infra-red portions of the electromagnetic radiation spectrum) against it and measuring the effect of the object portion upon the radiation. Alternatively, the condition of the processing may be monitored by measuring thermal emissions from the object portion, or by measuring temperature through contacting the object portion, or by measuring the capacitance across a portion of the article, or by measuring some other parameter that is related to the condition of the article being monitored.

The communication channel between the moving sensor(s) and the non-moving receiver utilizes electromagnetic radiation (for example, optical radiation, or radiation in the radio frequency or microwave portion of the spectrum), ultrasound radiation or other non-contact communication technique to carry the information from the moving sensor to the receiver. The received signal is used to provide information of the state of the article's processing, such as when an endpoint to the processing has been reached, which is then used to control the process, such as by terminating it after an endpoint is detected.

A specific application of this technique is for in situ, real time monitoring and/or control of a removal of material carried by a surface of the article, such as a semiconductor wafer substrate or intermediate integrated circuit structure formed thereon, with a chemical-mechanical-polishing ("CMP") process. The monitoring of a CMP process aids in controlling a reduction of the thickness of a film carried by the substrate and allows an accurate determination of an endpoint of the process. Such an endpoint can be, for example, when a certain amount of material has been removed from the film, when the film has been reduced to a certain desired thickness or when the film has been completely removed in at least some areas across its surface. Other data of a material removal rate and uniformity of the processing can also be obtained and utilized.

In the case of the CMP process, the sensor is attached to a carrier of the semiconductor or other article as it is moved by rotation and/or otherwise with respect to a platen. By using radiation communication between the sensor and a stationary receiver, no wires, optical fibers, or similar types of physical signal channels need be connected to the moving carrier. This eliminates the need for optical or electrical commutation, which can be difficult in a CMP application. A higher degree of reliability and flexibility results.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 4 is a more specific version of the CMP system embodiment of FIG. 3;

FIG. 7A shows an alternate structure of an elastomeric plug for the CMP system of FIGS. 4–6, and FIG. 7B shows that elastomeric plug installed in that system;

DESCRIPTION OF THE PREFERRED EMBODIMENTS

Figure 1:
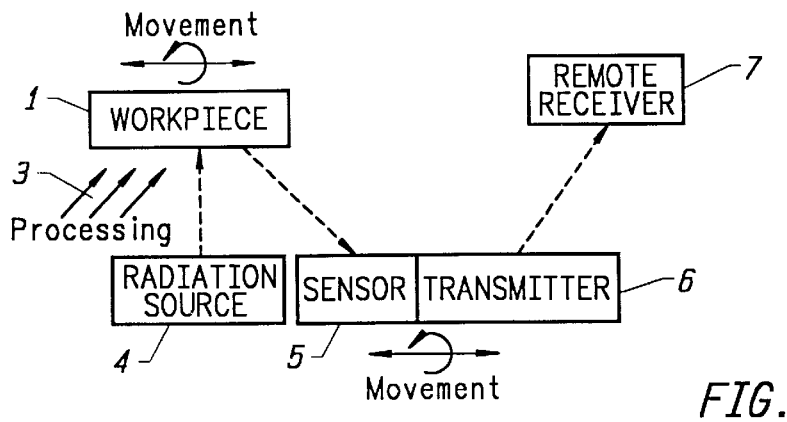
FIG. 1 conceptually illustrates the various aspects of the present invention.

Referring initially to FIG. 1, the present invention is conceptually explained. A workpiece 1, which can be any article that is subjected to processing 3 (including but not limited to a partially completed integrated circuit structure) is being moved during the processing. In the case of CMP, the processing involves contact with a surface of the workpiece 1. Other types of processing 3 include etching the workpiece with a liquid or vapor etchant, etching the workpiece with a dry plasma and other processes which do not contact the workpiece 1.

In order to monitor progress of the workpiece processing, some parameter indicating a condition of the workpiece that changes in response to the processing needs to be monitored. There are many such parameters that are possible. One is the temperature of a portion of the workpiece 1. Another the amount of frictional drag between it and a processing element. A further parameter is the black body emission of a surface of the object that is related to its temperature and emissivity. Yet another parameter is an acoustic emission of the object, or its response to incident acoustic radiation.

FIG. 1 illustrates the measurement of an optical parameter. The workpiece is illuminated with radiation from a source 4 and then radiation that radiation is detected by a sensor 5 after modification by the workpiece 1, such as after reflection or scattering from a surface of the workpiece 1 or after transmission through all or a portion of it. The source 4 of radiation can be acoustic or electromagnetic. If electromagnetic, there are a number of wavelength ranges throughout the spectrum which can be useful, including the visible, infra-red, ultra-violet, microwave, and radio frequency ranges. If acoustic radiation is employed, ultrasonic radiation is generally preferred. The particular type of radiation that is useful depends upon the workpiece and the process being implemented.

Data from the sensor 5 is obtained by the transmitter 6 and communicated with a remote receiver by a wireless technique. The sensor 5 and transmitter 6 are preferably formed in a single unit that can, optionally, also contain the radiation source 4. There is no physical electrical or optical link between this unit and the receiver 7, thus allowing the unit to also move, as indicated in FIG. 1. Difficult physical connections of a cable between the transmitter 6 and the receiver 7 are unnecessary. The receiver 7 need not be stationary but there is usually no purpose in moving it with either the workpiece 1 or the sensor/transmitter unit 5/6. The signal received from the transmitter 6 is normally communicated with an electronic controller of some type that processes data contained in the signal about the stage of the processing of the workpiece 1. This controller, such as a computer, is conveniently stationary. The communications link between the transmitter 6 and receiver 7 may be established by any type of radiation that is suitable for a particular application, such as electromagnetic radiation within the visible, infra-red, radio frequency, or microwave ranges, among others.

Figure 2:
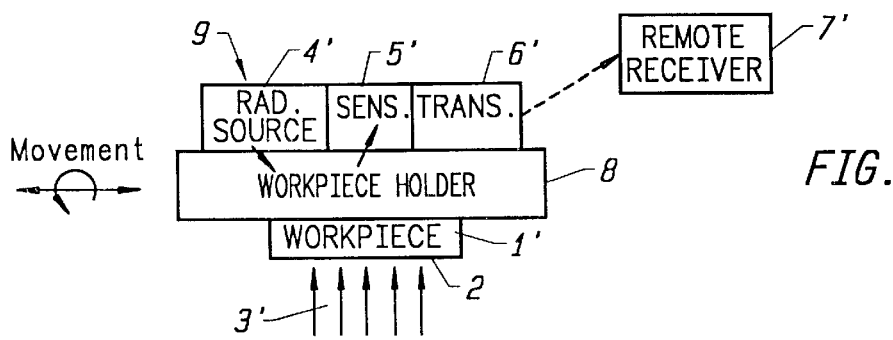
FIG. 2 is a more specific version of the conceptual diagram of FIG. 1.

FIG. 2 shows a more specific version of the conceptual FIG. 1, wherein like elements are identified with the same reference characters but with a prime (') added. In this case, a surface 2 of the workpiece 1' is subjected to some processing 3', that can be CMP, etching, or any one of many known surface processing operations where it is desirable or necessary to move the workpiece 1' in some manner. The workpiece 1' is carried by a holder 8 that is moved. Also carried by the holder 8 is the sensor/transmitter unit 5/6. A unit 9 may additionally include the radiation source 4'.

Since the source 4' and sensor 5' of FIG. 2 are on opposite sides of the holder 8 from the workpiece 1', some form of paths (not shown) are provided to communicate radiation through the holder 8 to the workpiece and then back from the workpiece 1' to the sensor 5'. If visible or near visible electromagnetic radiation is utilized, for example, these paths are each formed by an optical fiber. Although similar paths may be provided from the backside of the workpiece 1' to its surface 2, this is usually undesirable since the workpiece 1' should normally not be modified in order to monitor progress of the process. It is preferable to chose the radiation from the source 4' such that the workpiece 1' is transparent to the radiation but that its surface 2 does modify the radiation in some detectable manner related to the characteristic of the processing that is being monitored. If the workpiece 1' is a semiconductor wafer, it will be transparent to infra-red radiation with a wavelength in excess of one micron. If it is a change of thickness or breakthrough of a film on the surface 2 of a semiconductor wafer that is being monitored, such radiation reflected from that film carries such information.

Figure 3:
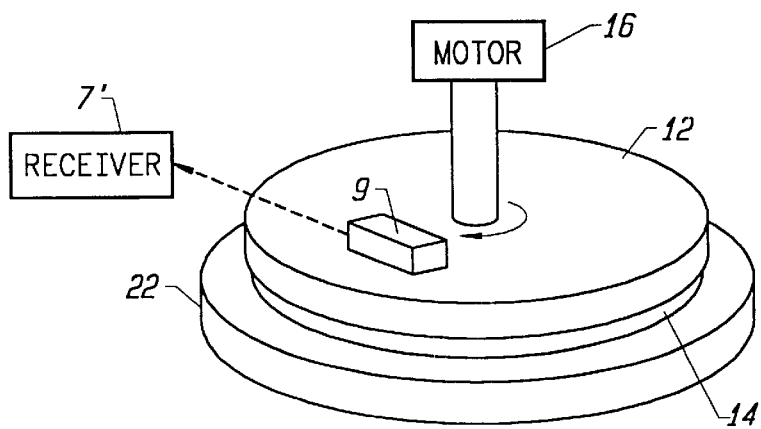
FIG. 3 shows one embodiment of a wireless CMP system embodying various aspects of the present invention.

FIG. 3 generally illustrates one application of the techniques described with respect to FIGS. 1 and 2. A CMP process is being monitored. As is normal in CMP equipment used with semiconductor wafers, a backside of a wafer 14 is attached to one side of a wafer carrier 12 that is rotated by a motor 16. The motor 16 and carrier 12 may also be given some translation motion. A front side of the wafer 14 is urged against a larger platen 22 with a slurry of an etching chemical and hard particles therebetween. The platen 22 is also moved, usually with a rotating component of motion. The radiation source/sensor/transmitter unit 9 is attached to the wafer carrier 12, in this case on a side opposite to that which holds the wafer 14. Interrogating radiation is communicated from the unit 9 through the carrier 12 to the backside of the wafer 14, as shown in more detail with respect to the embodiment of FIGS. 4, 5, 6A and 6B. If some other parameter is being sensed, such as the temperature of the wafer, an appropriate temperature sensor, such as a thermocouple or luminescent sensor, is positioned adjacent the wafer and communicated with the unit 9. The unit 9 communicates with the receiver 7' by a wireless technique of a type previously described. This communication can be intermittent, such as when a line-of-sight radiation beam from the unit 9 is rotated past a detector on the receiver 7', or continuous, depending upon the location of the receiver 7' and the type of radiation utilized.

FIGS. 4, 5, 6A and 6B show in more detail a technique and system for monitoring a semiconductor CMP process. Referring first to FIG. 4, the semiconductor wafer 14 is held by the carrier 12 and rotated by the motor 16 against the platen 22 with a slurry therebetween, as described with respect to FIG. 3. Instead of a single unit 9, however, two or more such radiation source units 24 are distributed around the carrier 12. In this case, four such units 24*a*, 24*b*, 24*c* and 24*d* are equidistantly distributed around the carrier 12. Each of these units includes an emitter of a directional radiation beam 26 which is cast upon a radiation detector of a stationary receiver once each revolution of the carrier 12. The radiation beam 26 carries data from which the state of the surface of the wafer 14 may be determined by a controller 30. Similarly, the receiver 34 sends control and timing information to each of the units 24*a–d* once each revolution of the carrier 12 by a directional radiation beam 34. Each of these units contains a detector that responds to the beam 34.

As an alternative to the arrangement of FIG. 4, the receiver 28 can be positioned along an axis of rotation of the carrier 12 and the units 24*a–d* all positioned with their radiation emitters and detectors facing the receiver at all times. A separate receiver could alternatively be provided in such a position for each of the units 24 on the carrier 12, so that time sharing of a single receiver 28 would not be necessary. And, of course, if non-directional radiation, such as radio frequency electromagnetic radiation, is used to communicate between the receiver 28 and the units 24, there is much greater freedom of placement of the receiver 28.

Information of the article being processed that is obtained by the techniques described herein can be simply observed by an operator or can be used to automatically control some aspect of the CMP process. The monitoring controller 30 is separate from a CMP system controller 31. The two can communicate with each other over electrical circuits 32. A determination by the controller 30 that the processing of the workpiece has reached its endpoint, for example, can be communicated to the system controller 31 to cause the processing to be stopped.

The components of the monitoring system can rather easily be added to an existing CMP system, either by the manufacturer of the CMP system or by a user who has already purchased such a system. Only a minimum reworking of the existing CMP system is necessary to retrofit it with the monitoring system being described. Power for each of the sensors 24*a–d* is preferably provided by a replaceable battery.

Use of multiple sensor units 24*a–d* allows information to be obtained of the uniformity of the processing. That is, since changes being caused to the workpiece 14 by the processing are monitored at more than one location, the readings may be compared in order to determine whether the changes are uniformly occurring over the surface of the workpiece. Although four sensor units 24*a–d* are shown equally distributed around the carrier 12, other numbers and arrangements may alternatively be employed. Since the sensor units 24*a–d* are held fixed with respect to the workpiece 14 and rotate with it, the same locations of a given workpiece are monitored throughout its processing. The use of the multiple sensor units 24*a–d* also provides some redundancy in case one of the units fails during processing.

Figure 5:
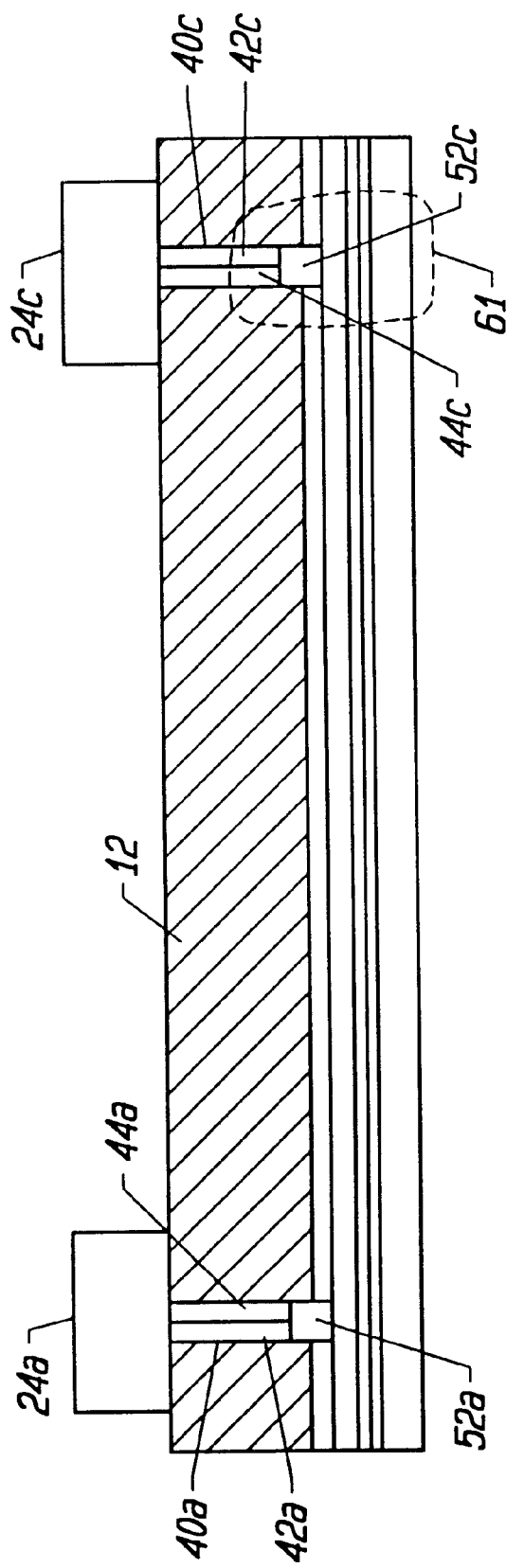
FIG. 5 is a sectional view of the CMP embodiment of FIG. 4, taken across section 5—5 thereof.
Figure 6A:
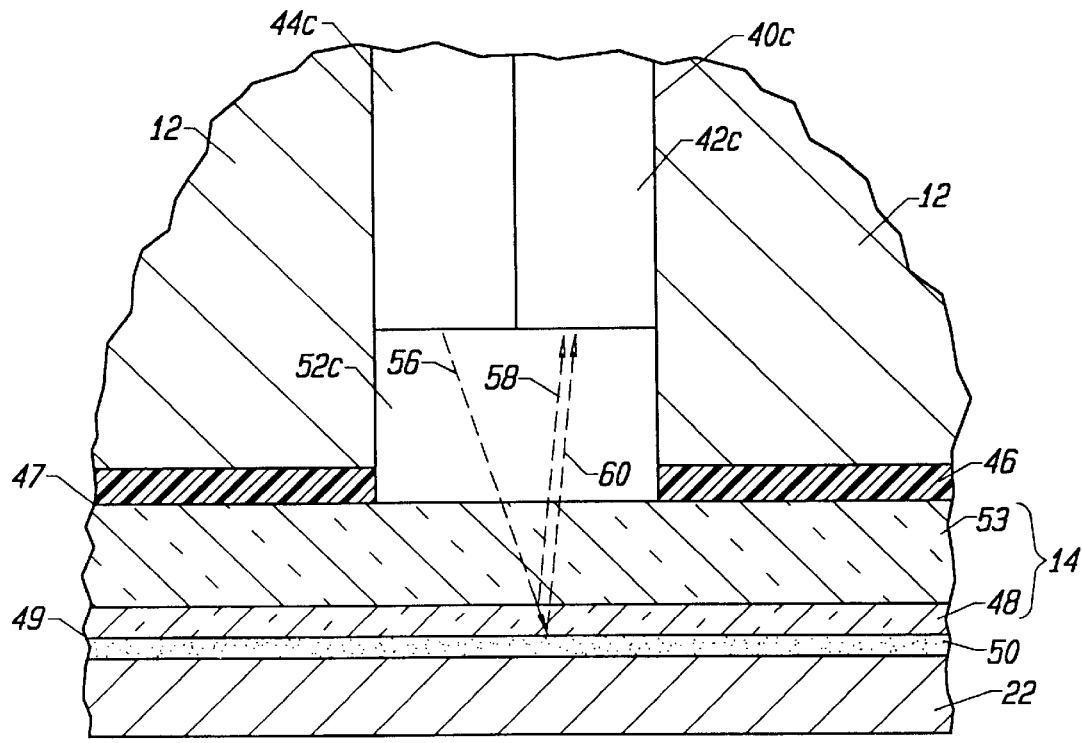
FIGS. 6A and 6B are expanded views of a portion of FIG. 5 for two different applications of the CMP system of FIGS. 4 and 5.
Figure 6B:
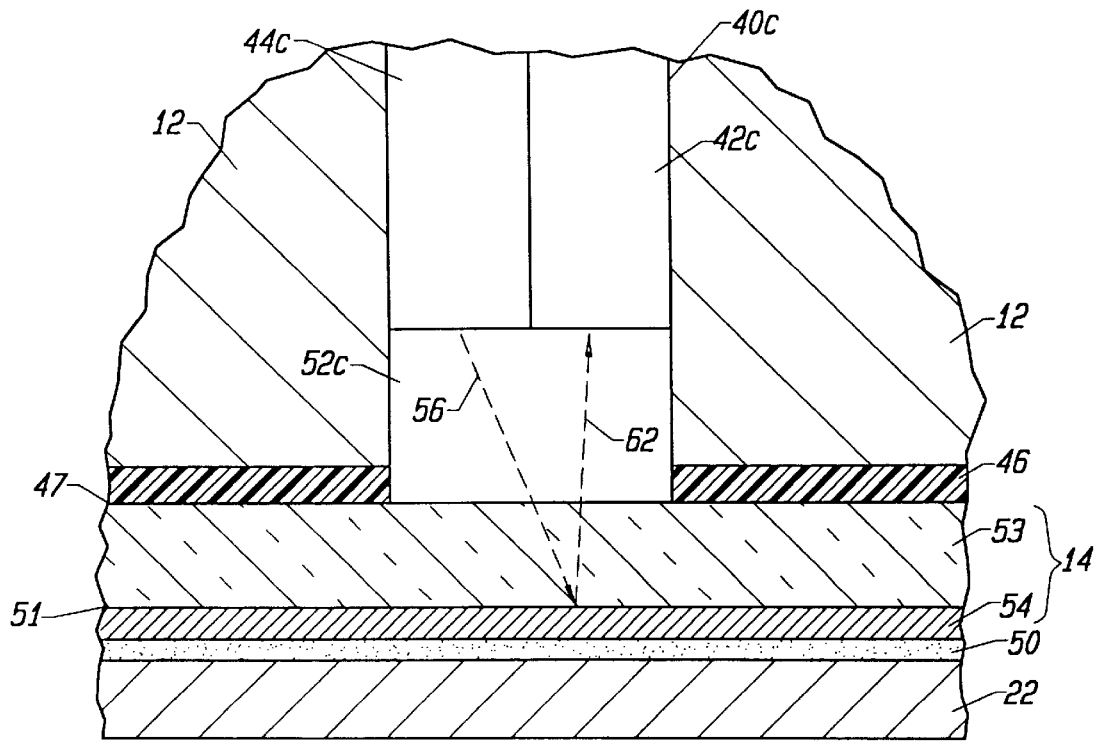

FIG. 5 shows a cross-sectional view of the CMP system of FIG. 4 along line 5—5 of FIG. 4. Each sensor unit 24 communicates infra-red radiation to and from the semiconductor wafer workpiece 12 through a pair of optical fibers 42 and 44 positioned within a hole 40 through the carrier 12. FIGS. 6A and 6B show an enlarged view of a region 61 of FIG. 5 during monitoring of two different applications of the CMP system 10 to semiconductor wafer processing. A thin polymer pad 46 is interposed between the wafer 14 and the carrier 12, as is usual in CMP systems. A hole is provided in the pad 46 underneath each of the sensor units 24*a–d*, being shown in FIGS. 6A and 6B to be coincident with the opening 40*c* through the carrier 12 in which optical fibers 42*c* and 44*c* extend.

A plug 52*c* of transparent elastomeric material, such as silicone, is installed in the hole 40*c*, between ends of optical fibers 42*c* and 44*c* and the wafer workpiece 14. A similar plug is used with each of the other sensor units 24*a*, 24*c* and 24*d*. One purpose of the plug 52*c* is to seal the interior of the respective openings 40 in the carrier 12 against an intrusion of fluid material, air bubbles, particles and other contaminants during processing. This sealing action is achieved by making the natural (i.e. uncompressed) plug have end faces in a dome shape and a length between end faces that is greater than the depth of the opening of the carrier 12 and pad into which it is fit. The geometry of the plug is to protrude slightly beyond the surrounding pad 46. When the wafer is loaded onto the carrier 12, the load force urges the wafer to compress the plug protrusion. During this compression process, fluid material and air bubbles are expelled from the contact zone to product the desired seal action. The contact zone is generally round and expands radially outward as compression increases. The amount of compression in the plug material depends on the geometry of the dome shaped ends and the material properties of the elastomeric material. The plugs may be periodically replaced in order to maintain clarity in communication of optical signals therethrough between the optical fibers 42 and 44 and a backside of a semiconductor wafer 14 as the workpiece.

The plug can have several different configurations for installation into the carrier. One example is shown in FIG. 7A, with its installation into a modified opening 40' of the carrier 12' illustrated in FIG. 7B. A solid piece 57 of elastomeric material fills a central portion of a generally cylindrical hard sleeve 55 so that the whole assembly can readily be installed and removed from the carrier 12'. In this example, the outer surface of the sleeve 55' and the inner surface of the opening 40' of the carrier 12' are cooperatively threaded for easy installation and removal of the plug 52c' into the carrier 12' by a rotating action. Ends of the elastomeric material piece 57 (FIG. 7A) are generally domed shape when not installed in the carrier 12'. But when installed, one end of the piece 57 is compressed against the optical fibers 42c and 44c, and the other end is compressed against the workpiece 14. Other specific plug and sleeve configurations may alternatively be employed.

The plug 52c also serves as a light guide between the optical fibers 42 and 44 and the wafer workpiece 14. The material of the plug preferably has a refractive index that lies between that of the fibers 42 and 44 and that of the wafer 14 to minimize reflection losses at those interfaces. For instance, 80 percent more useful radiation can be directed to the wafer when a silicone plug is used than when an air gap remains between the optical fibers and the wafer. Furthermore, the presence of a silicone plug contacting the fibers reduces the spread angle of the radiation exiting from the fiber. This action facilitates an increased collection of reflected light radiation from the wafer.

With reference to FIG. 6A, a layer 48 is carried by a semiconductor wafer substrate 53, forming the workpiece 14 in this example. The layer 48 is being planarized. This layer is transparent to the interrogating radiation and will often be a silicon dioxide material, or that of some other dielectric. With reference to FIG. 6B, an example is shown where a metal layer 54 is carried by the substrate 53 and being planarized. The metal layer is opaque to the interrogating radiation. Interposed between the layers 48 or 54 and the platen 22 is a usual slurry layer 50 that is used in CMP processes. A usual porous polymeric polishing pad mounted on the platen 22 is not shown, for simplicity.

Figure 8A:
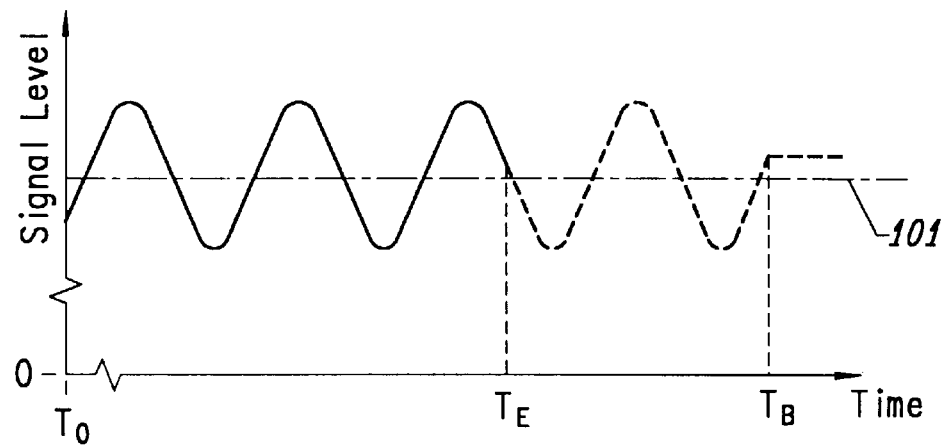
FIGS. 8A and 8B show typical signals produced by the CMP system of FIGS. 4 and 5 for the two different applications illustrated in FIGS. 6A and 6B, respectively.

As described in the Prior Application, the conditions which may be detected are different depending on the material of the layer being planarized. If the material being removed is substantially transparent to the interrogating electromagnetic radiation, the thickness of such a layer 48 of FIG. 6A may be monitored while being reduced. The interrogating radiation is reflected by both surfaces of the layer, as indicated by the ray 56 of the interrogating radiation from the optical fiber 44c being reflected into the optical fiber 42c from the initial surface (which does not change) as a ray 58 and from the surface being planarized (which is being moved closer to the initial surface during the CMP process) as a ray 60. The sensor unit 24c detects an interference between the reflections from the two surfaces of the layer 48. As the thickness of the layer 48 is reduced by the CMP process, a component of the detected optical signal appears as shown in FIG. 8A, one complete cycle between maxima and minima occurring as the layer 48 is reduced by an amount equal to one wavelength of the interrogating radiation divided by twice the refractive index of the layer 48 at that wavelength. For this measurement, the interrogating radiation is preferably made to be coherent or substantially so; typically, a coherence length of the interrogating radiation should be equal to or greater than twice the thickness of the film 48 being measured. Solid state light sources, such as diode lasers or light emitting diodes (LEDs), are preferably used to generate the interrogating radiation.

In order to measure the amount that the layer 48 has been reduced in thickness, the number of cycles (FIG. 8A) that the detected interference response has undergone during the CMP process is determined. At some point $T_E$, the thickness of the layer has been reduced by a desired amount; that is, an endpoint to the CMP process. This is often all the information that is necessary to control the process and determine its endpoint. By also knowing the starting thickness of the transparent layer 48, the measured thickness removed is subtracted to determine the remaining thickness of the layer 48. It is often desired to determine, as an endpoint of the process, when the layer has been reduced to a certain thickness. The CMP process is then stopped. This technique monitors a reduction in the thickness of the layer 48 when carried directly by the substrate 53, as shown in FIG. 6A, or when there are additional integrated circuit structures therebetween. In addition to monitoring the thickness of a layer on a substrate, this same technique is useful to monitor a reduction in thickness of the substrate itself.

If the CMP reduction of the thickness of the layer 48 is not stopped at some time $T_E$, material will continue to be removed from the layer 48 and the detected radiation interference pattern continues, as shown in dashed outline in FIG. 8A. Eventually, the layer is completely removed in the area being monitored ("breakthrough"), at which time $T_B$ the detected intensity of the reflected radiation becomes constant. There are situations where the breakthrough $T_B$ is the desired endpoint.

No matter what specific condition is designated as the endpoint of the process of removing material from a transparent layer, that process may be controlled in real time, before reaching its endpoint, from the information being received in the form of FIG. 8A. By also measuring the amount of time elapsing during the process from its beginning, a rate of material removal is easily calculated by the controller 30. The rate is the amount of material measured to have been removed during a certain time interval, divided by the amount of time in the interval. In response to such rate information, the CMP process may be adjusted until a desired removal rate is obtained and maintained. Some predetermined changing removal rate profile may also be maintained by such a closed loop technique. The removal rate may be calculated from the signal from each of the sensor units 24a–d individually and then averaged to obtain the quantity used to control the process. The process can be controlled, for example, by adjusting the force applied to the workpiece, the concentration of the slurry, etc. These calculated quantities can be used, for example, to prevent a drift in the rate of material removal from the layer 48. In addition, differences in the rates of removal of material at the locations of the sensor units 24a–d may also be calculated and adjustments made in real time to the CMP processing parameters that affect uniformity. Further, these same measurements can be used on a dummy wafer in order to set the CMP parameters for subsequent use with actual wafers.

Figure 8B:
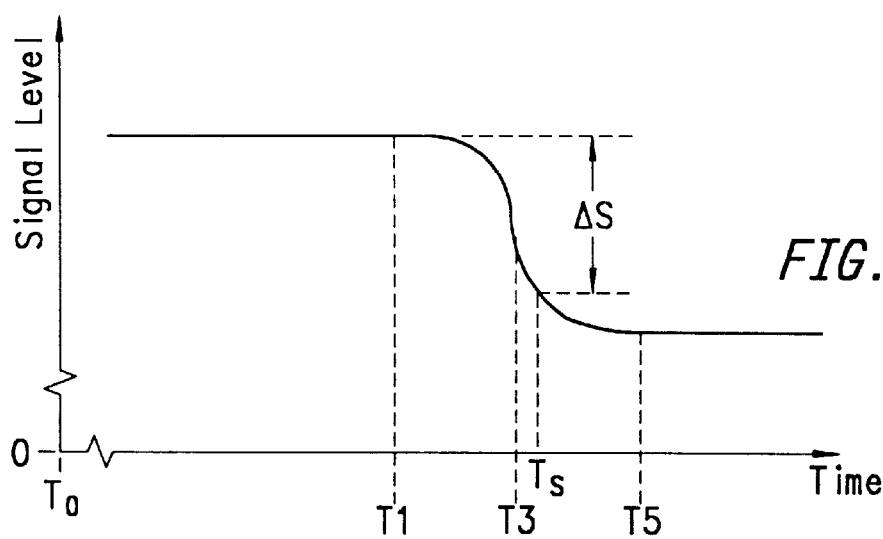

The cyclic detected response does not occur when the layer being removed is substantially opaque, such as the metal layer 54 of FIG. 6B. The interrogating radiation is substantially totally reflected, specularly or diffusely, by the layer's initial surface. As shown in FIG. 6B, an incident ray 56 of the interrogating radiation is reflected as a ray 62 without penetrating the layer. The response of the sensor unit 24c that detects the reflected radiation is then uniform, as shown in FIG. 8B, until time T1 when it begins to decrease. This decrease occurs as the layer is gradually removed in an area being monitored by the incident radiation beam. A sharp decrease in intensity of the reflected beam occurs, until time T5 when all of the opaque layer 54 that is going to be removed in the area monitored by the radiation beam has been removed. This is the desired "breakthrough" of the material layer. Thereafter, if the processing is allowed to continue, the intensity of the signal is again uniform but at the lower level. The CMP process is terminated at some time relative to the breakthrough, usually at a time shortly thereafter. The controller 30 uses data of the signal of FIG. 8B for each of the sensor units 24a–d to calculate when a breakthrough is occurring at each of the locations monitored by the sensor units. One straightforward way to do so is to note when the transition of the signal of FIG. 8B has occurred, such as by monitoring its slope, and then wait for a predetermined time after T5 to terminate. This directly measures a breakthrough.

Figure 8C:
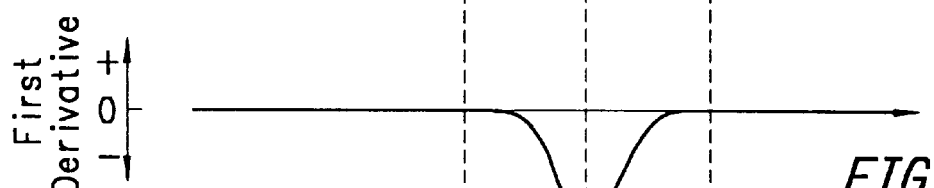
FIG. 8C is a mathematical derivative of the curve of FIG. 8B.
Figure 8D:
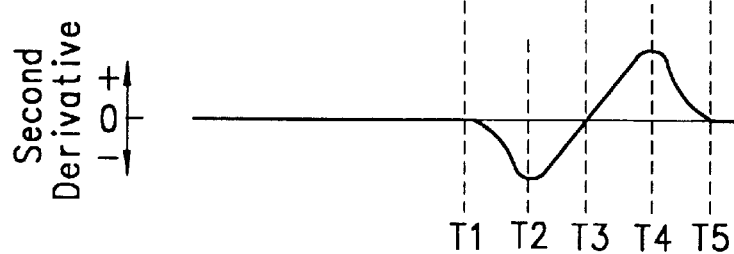
FIG. 8D is a second derivative of the curve of FIG. 8B.

There are several ways, however, that the occurrence of the breakthrough may be predicted during the sharp transition of the signal of FIG. 8B between times T1 and T5. One way is to detect a drop of $\Delta S$ in the signal of FIG. 8B, thus determining at a time $T_S$ that a breakthrough is about to occur. This threshold $\Delta S$ is made to be less that the total drop of the signal but not so much less that it is triggered by noise in the signal. Another is for the controller 30 to calculate the derivative of the signal of FIG. 8B, as shown in FIG. 8C, and then detect the minimum of the derivative at time T3. Yet another predictive technique is to calculate a second derivative of the signal of FIG. 8B, as shown in FIG. 8D, and then detect a zero crossing of the signal at time T3. Alternatively, the peaks of the second derivative curve of FIG. 8D may be detected at times T2 and T4 as a predictor of an upcoming breakthrough of the opaque layer 54.

In addition, the transition region of the curve of FIG. 8B between times T1 and T5 has been found to be exponential in nature. Therefore, it is possible to identify the transition process by plotting the logarithm of a signal change (relative to a suitable steady value before the transition) against time and locating a linear portion of this plot that is indicative of the exponential transition. For example, a twenty percent breakthrough level can be identified using this approach. Such a preamble to a full breakthrough can be useful in some applications.

Figure 9:
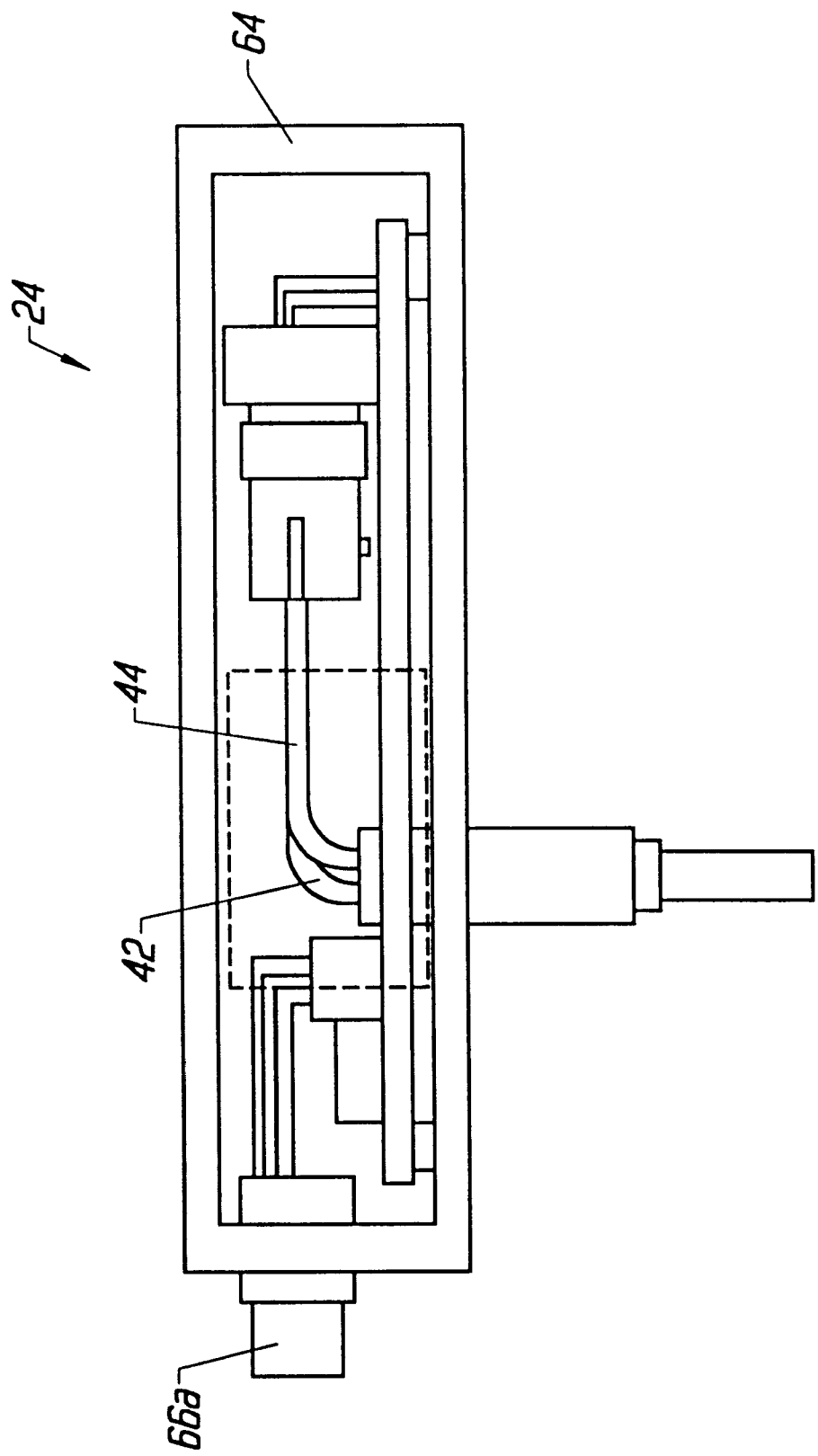
FIG. 9 is a side view of the inside of a typical one of the four sensors of the CMP system of FIGS. 4 and 5.

FIG. 9 shows a side view of a typical one of the sensor units 24 with its side wall removed, exposing its optoelectronic components therein. The optical fibers 42 and 44 are seen to exit a side of the sensor unit that contacts the carrier 12 but they could instead exit some other side and be routed through the carrier 12 at a location somewhat removed from the unit. Because contaminants in the form of the slurry 50 are intentionally introduced for a CMP process, it is preferred that a housing 64 of the sensor unit be hermetically sealed so as to protect the electronic and optical components therein. The hermetic seal helps in protecting against short circuits or degradation of the electronic components therein.

Figure 10:
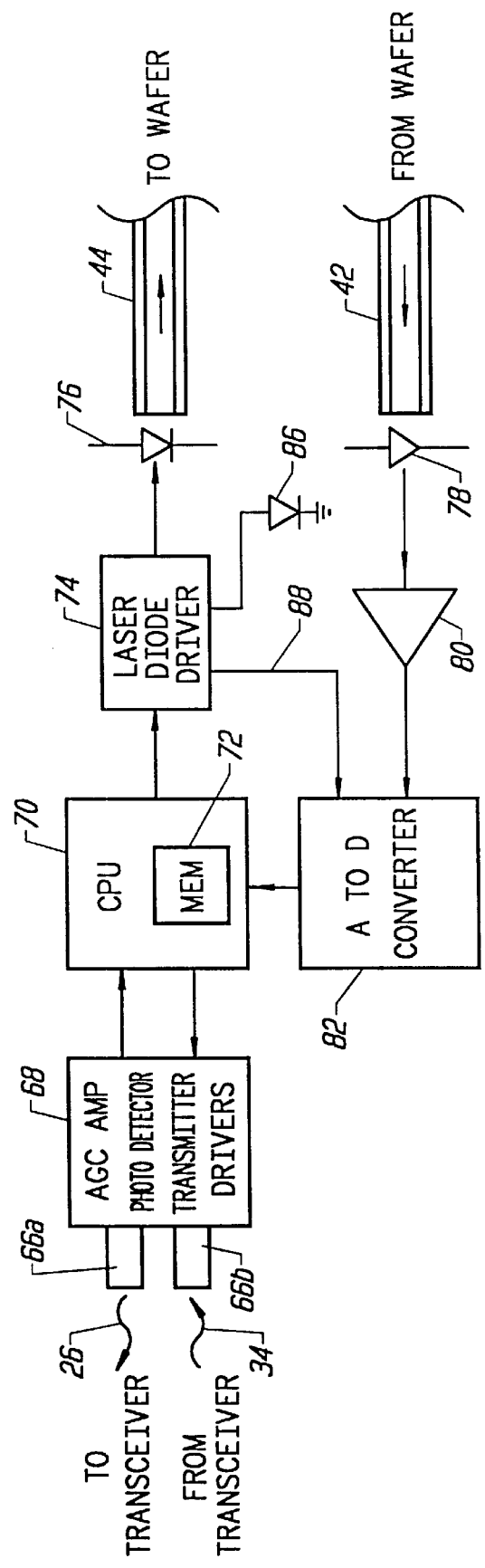
FIG. 10 is a schematic optical and electronic diagram of one of sensors of the CMP system of FIGS. 4 and 5.

FIG. 10 shows a schematic diagram of the contents of each of the sensor units 24. A communication link integrated circuit chip set 68 (transceiver) conforms to a standard established by the Infrared Data Association and is commercially available. The transceiver 68 includes an infrared transmitter and its associated drivers for transmitting an optical signal 26 containing data to the remote transceiver 28. The transceiver 68 also includes a photodetector and an amplifier with an automatic gain control (AGC) for receiving an optical signal 34 from the remote transceiver 28. Although the transceiver chip set 68 is preferred because of its multiple function capabilities, other types of communication link hardware, including discrete components, can be substituted. A central processing unit (CPU) 70, having its own internal memory 72, is coupled to the transceiver 68 for controlling operation of the sensor unit 24. A laser diode driver 74 is coupled to the CPU 74 for receiving instructions therefrom for driving a laser diode 76. The laser diode 76 is coupled to the optical fiber 44 for sending the interrogating electromagnetic radiation beam 56 to the wafer 14. A photodetector diode 78 is coupled to the optical fiber 42 for receiving the radiation reflected from the wafer 14 and is coupled to an amplifier 80 to amplify the signals derived from the reflected radiation. The amplifier 80 is coupled to an analog-to-digital converter (ADC) 82 for digitizing the analog signal present at the output of the amplifier 80. The ADC 82 relays the digitized signal to the CPU 70 where it is stored in memory 72.

In operation, the CPU 70 prompts the laser diode driver 74 to drive laser diode 76 so that it generates and transmits the interrogating electromagnetic radiation beam to the wafer 14. The radiation beam is guided by the optical fiber 44 to the wafer where it is reflected by the wafer being processed into the optical fiber 42. The reflected radiation is detected by the photodetector diode 78. The amplifier 80 amplifies the signal generated by the photodetector 78 and transmits it to the analog-to-digital convertor 82 where it is converted into digital data that is sent to the CPU 70. This is data of the signal level curves of FIGS. 8A or 8B when a radiation transparent or opaque layer is respectively being processed, as described above. The CPU 70 stores the data in its internal memory 72 and awaits a data-request instruction from the remote transceiver 28 requesting the data. Once the CPU 70 receives the data-request instruction, the CPU 70 sends the data to the transceiver chip set 68 where it is subsequently transmitted to the remote transceiver 28.

The sensor units 24a–d each desirably include components for temperature compensation. Because heat is generated during the planarizing or polishing process, many of the components in the sensor units will be subjected to temperature variations and the data will be affected as a result. The sensor unit 24 circuit of FIG. 10 includes a temperature compensating diode 86 coupled to the laser diode driver 74 for compensating for the temperature dependency of laser diode 76. Generally, it is preferred that temperature compensating diode 86 be a matched diode manufactured in the same lot with laser diode 76. The laser diode driver 74 also provides a temperature compensation correction signal along line 88 to the ADC 82 for compensating for the temperature dependency of the driver 74.

Because the opto-electronic components 76 and 78, the microprocessor 70, the wireless communication circuit 68 and other elements of the sensor units shown in FIG. 10 all draw energy from one or more batteries on the carrier 12, in a preferred embodiment, it is desirable that the battery life is sufficiently long to avoid the inconvenience of frequent replacement. The battery can be a disposable or a rechargeable type. For rechargeable batteries, the path of transferring charging energy to the rotating carrier 12 can be, as examples, through mechanical contacts such as slip rings, through an air-gap transformer, through a solar-cell receiver, through direct light radiation, etc. To reduce energy drain from the battery, the sensor circuit powered by it can be placed in a low-power consumption "sleep" mode when not in service, or if instructed by the controller 30 to go into the sleep mode, or after a predetermined period of inactivity. These circuits are then "wakened" by the controller 30 at a later time by a control signal sent on the radiation beam 34. Additionally, the opto-electronic elements can be operated in a pulsed mode. For example, the diode laser 76 can be driven in a discontinuous mode by the driver 74, to save energy consumption from the battery. The detection circuits can also be gated in phase with the illumination radiation pulses to be fully operable when a reflected pulse is received but in a low power mode in between pulses.

This description of the electronic circuits assumes that each of the sensor units 24a–d is self contained and operates separately from the others. However, a common electronic system can be provided on the carrier 12 for all of the sensor units. The common circuitry can include the transceiver chip set 68, the CPU 70, ADC 82, and the temperature sensor 84. These common components are then coupled with the laser diodes, laser diode drivers, photodetectors, and amplifiers that are provided within each of the sensor units 24a–d. This alternative has advantages of reducing the number of electronic components carried by the carrier 12 and forming a single remote data link with the transceiver 28. Communication between the moving sensor units and stationary transceiver is then simplified.

Figure 11:
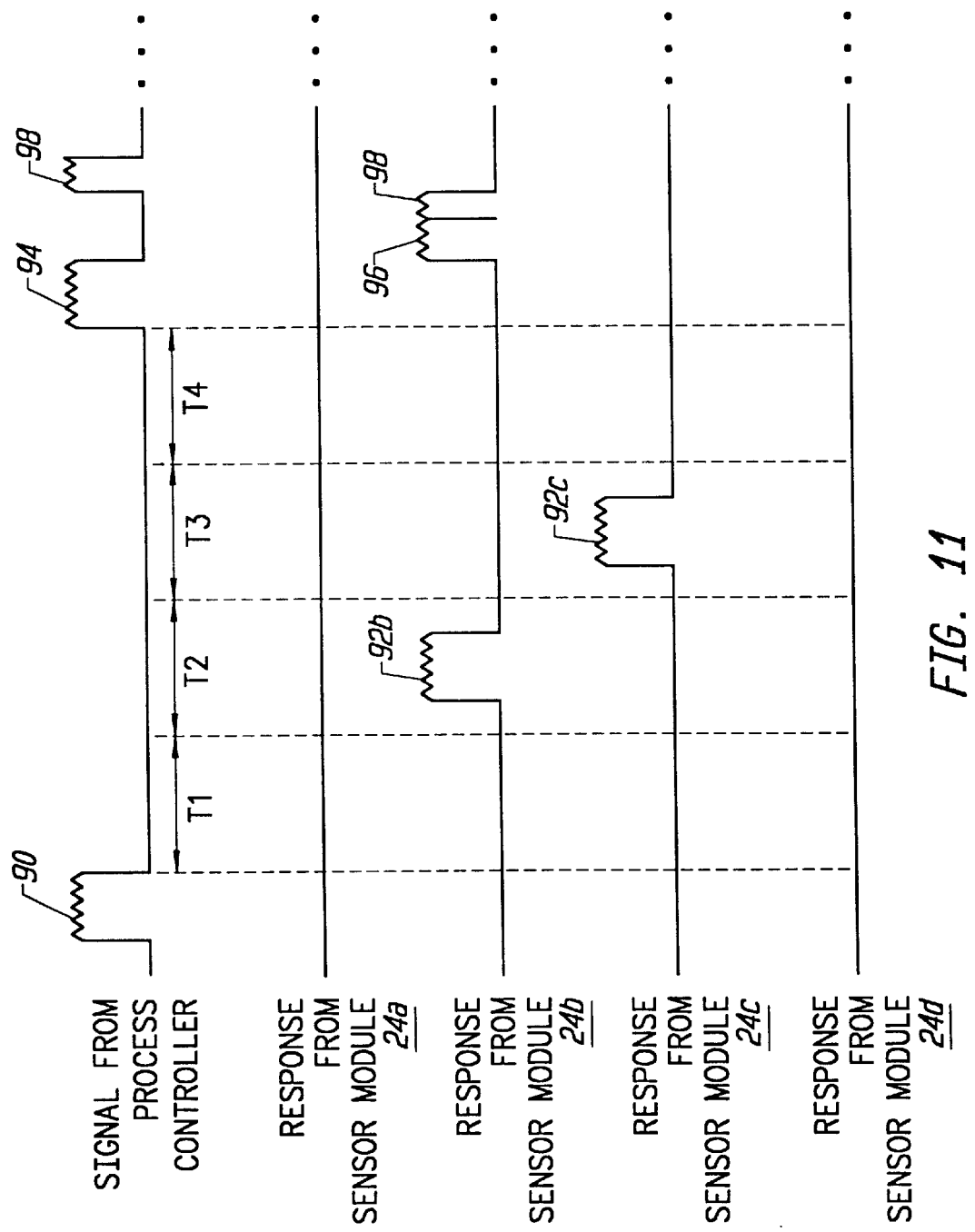
FIG. 11 is a timing diagram that illustrates one technique for remote communication between multiple sensors and a host processing station.

FIG. 11, however, illustrates with a timing diagram one way of individually communicating between multiple sensor units 24a–d and the transceiver 28 of the system of FIGS. 4–10, in order to transfer data from the sensor modules 24a–d to the controller 30. The controller 30 initially sends an identification-request signal 90 to the sensor modules 24. If any of the sensor modules 24 receives the identification-request signal 90, those sensor modules send back an identification signal, such as identification signals 92b and 92c illustrated in FIG. 10. The example illustrated shows that the sensor modules 24a and 24d did not send an identification signal because they never received the identification-request signal 90. The sensor modules 24 identify themselves by sending the identification signal 92 during a specific time window (i.e. one of the windows T1–T4) after the identification-request signal 90 is sent. In other words, after the controller 30 sends the identification signal 90, it allots a specific time window T1–T4 for each of the sensor units 24a–d. The controller identifies from which sensor unit a specific identification signal came by determining within which of the time windows T1–T4 the identification signal was received. For example, in FIG. 11, the time window T1 is reserved for sensor unit 24a, the time window T2 is reserved for sensor unit 24b, and so on.

After receiving the identification signals, the controller 30 then causes a data-request signal 94 to be sent to one of the sensor units which sent an identification signal to the process controller 30. For example, in FIG. 11 the controller 30 chose to send the data-request signal 94 to the sensor unit 24b. During a normal process, only one identification signal should be received. Therefore, a determination of which sensor unit is to receive the data-request signal 94 is easily accomplished. When more than one identification signal is received, the controller 30 chooses which sensor unit is to receive the data-request signal. It is preferred that the controller choose a sensor unit to receive the data-request signal in order that transmission of data from each sensor module is cycled to the controller 30. After a requested sensor unit receives the data-request signal 94, it transmits the data 96 to the controller 30 by way of the remote transceiver 28. Transmitted along with the data is an error checking code 98 which is sent by the transceiver 28 back to that particular sensor unit so it can check whether the data was accurately received. The process is then repeated, beginning with the sending of the identification-request signal 90 and ending with the checking of the error checking code 98 so that data from each sensor module is transferred to the controller 30 until the controller determines that the planarizing or polishing process is complete.

An alternative to this time division technique of communicating with multiple sensor units is to assign a specific address to each of the sensor units 24a–d. (See FIG. 4) The controller then periodically sends a request to all the sensor units 24a–d to identify the one or more that are in communication with the transceiver 28. In response, each such sensor unit transmits its unique identification signal. If more than one unit responds, the processor 30 then selects one of them to be interrogated and sends a signal addressed to that one unit to provide its data. All this happens while the addressed one of the sensor units is within the field of view of the transceiver 28. After obtaining the data from the one addressed unit, the communication process is repeated until an article processing endpoint is reached.

The gathering of data by the sensor units 24a–d is a continuing process. When one sensor unit is dumping its data to the controller 30, all sensor units are continually analyzing the planarizing or polishing process and storing data in the internal memory 72 of the CPU 70. This data is subsequently cycled into the controller 30. There may be times when the process controller is busy doing other things that it skips a cycle of receiving data. This event does not affect the data gathering process since data is constantly stored in the internal memory 72 of the CPU 70 of each of the sensor units 24a–d and, consequently, no data is lost due to such an event.

This process of shuffling in data from the sensor units 24a–d to the controller is not limited to the processing applications being described, but rather it can be used generally when there are a plurality of transceivers in data communication with a central unit. This technique may have many applications, such as in video or TV signal transmissions, radio transmissions, satellite transmissions or other non-guided transmissions having multiple daughter units in data communication with a mother unit.

Although the transmission of data from the sensor units 24a–d to the controller 30 by way of the remote transceiver 28 has been described using optical techniques, it shall be understood that other means of transmitting the data can be employed, such as transmission by radio frequency (RF) signals. If data transmission links 26 and 34 use RF waves to transmit data from the sensor modules 24a–d to the remote transceiver 28, there are several ways to transmit the data from each sensor module to the controller 30. One method is to use the techniques described above. Another method is to have each sensor unit transmit the data by spread spectrum technique and have the data "shuffled in" using time-division multiplexing. Yet another method is to have each sensor unit transmit the data with a unique carrier frequency. Using this technique, the data can be sent simultaneously to the controller.

Figure 12:
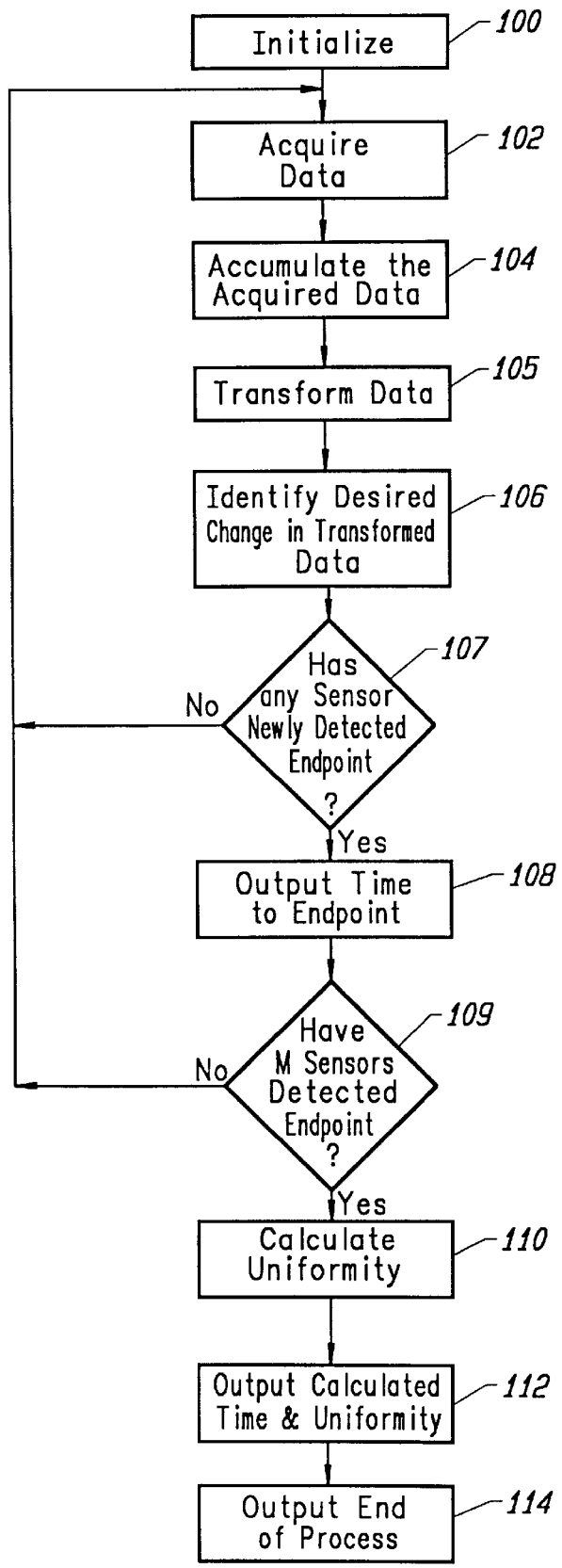
FIG. 12 is a flow chart of an example determination of the endpoint of removal of an opaque layer.

FIG. 12 is a flow chart that illustrates a processing algorithm executed by the controller 30 in order to determine when a process of removal of the opaque layer 54 (see FIG. 6B) has been completed (see FIGS. 8B, 8C and 8D). After an initialization step 100, data is acquired, in a step 102, from each of the multiple sensing units in one of the ways described above or in even other ways. This data is accumulated for each sensor, in a step 104. In a next step 105, this accumulated data is transformed in some way, such as by taking a first derivative (FIG. 8C), or by taking a second derivative (FIG. 8D), or by setting the threshold level ΔS, or by taking the logarithm of the data, all as previously described.

In a step 106, it is determined, for each of the sensor signals, whether the transformed data has a characteristic that is predictive of an imminent breakthrough. The technique here depends upon how the data was transformed in the step 105. If a first derivative of the data was taken in step 105, its minimum value is detected at time T3 (FIG. 8C) in step 106. If a second derivative was taken, its zero crossing at time T3 or its two peaks at times T2 and T4 are noted (FIG. 8D). If the threshold ΔS (FIG. 8B) was set, the step 106 determines when the signal has fallen by more than ΔS. Finally, if the logarithm of the signal was been taken in step 105, a linear region indicative of the signal transition is detected in step 106.

In a step 107, it is determined whether any one of the sensor units 24a–d has detected for the first time that a breakthrough is imminent, and thus that the process is coming to its endpoint. If not, the steps 102–106 are repeated. If this condition is so detected, then the time of the processing to reach that point is measured and presented as an output, in a step 108. This is the time taken from the beginning of the processing until the detection that a breakthrough is about to occur in the region being monitored by the sensor. This time gives an indication of the parameters of the process and, when compared to the times for other sensors to reach the same point, provides information of the uniformity of the process across the workpiece.

Whether a breakthrough in the removal of the layer 54 (FIG. 6A) is about to occur is determined for each of N (4 in this example) sensor units 24a–b. In a step 109, it is determined whether breakthrough has been determined for M number of the sensors, where M is equal to or less than N. The number M can be set to be all the sensors (4 in our example), one less than all the sensors (3 in our example), a majority of the sensors or any other number. If this condition has not been reached, the calculation steps 102–106 illustrated in FIG. 12 are repeated.

Once the condition of step 109 is reached, certain other calculations are optionally made, in a step 110, in order to determine how long the process took to reach breakthrough and to calculate the uniformity of material removal over the surface of the layer 54. This is done by using the time measurements made for each of the sensor units 24a–d in the step 108. An average or mean time is an indication of the efficiency of the process, and an extent of a statistical variation among the times that the sensors take to reach endpoint is an indication of the uniformity of the process across the surface of the layer 54. These two quantities can be quite useful to an operator to adjust process parameters for the next wafer, or can even be used to automatically adjust process parameters on the next wafer. These two quantities are outputted in a step 112. In a step 114, an output is given that an end of the process has been reached. This later output is also used by an operator to terminate the CMP process, or, alternatively, is used directly by the system controller 31 to automatically terminate the CMP process.

Figure 13A:
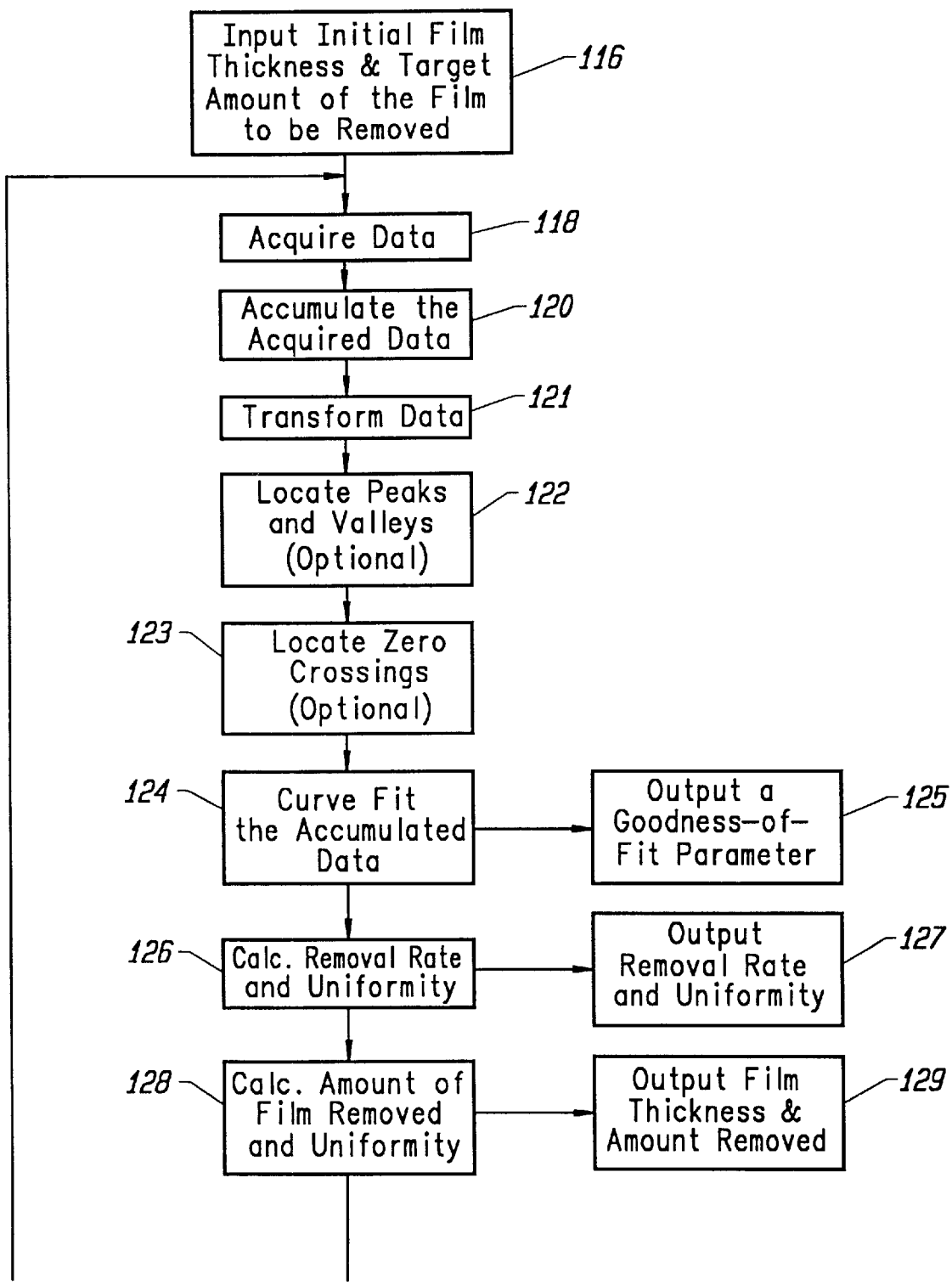
FIG. 13 is a flow chart of an example determination of the endpoint of removal of a transparent layer.
Figure 13B:
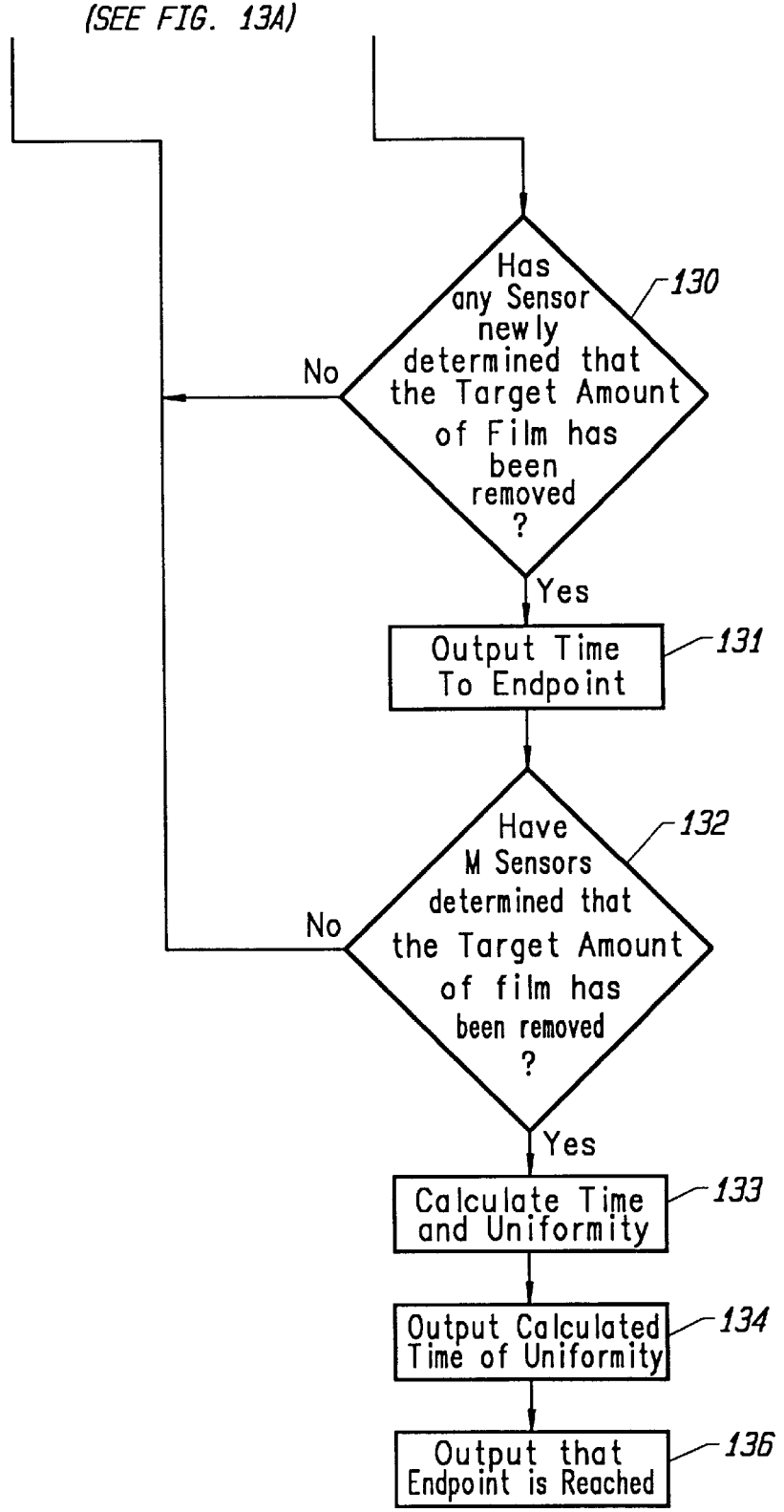

FIG. 13 is a flow chart that illustrates a processing algorithm executed by the controller 30 in order to determine when a process of reducing the thickness of the transparent layer 48 (see FIG. 6A) has reached an endpoint $T_E$ (see FIG. 8A). This is generally similar to the process illustrated in FIG. 12 but differs where necessary because of different characteristics in the signals represented by the data being analyzed. In a first step 116, the operator inputs some items of data. One item can be the initial thickness of the film 48, which can be determined by measurement or ascertained from the parameters of the process used to form the layer. Another item is the target amount of that layer that is to be removed by the CMP process.

Data is acquired from each of the sensing units 24a–d, in a step 118, and accumulated by the controller 30, in a step 120. The accumulated data is transformed, in a step 121, by making an appropriate arithmetic calculation. In a step 122, the number of peaks and/or valleys of the cyclically varying signal (see FIG. 8A) can be counted in order to give a rough measurement of the amount of material that has been removed from the layer 48. Alternatively, or in combination, a step 123 detects the crossing of the varying signal through a zero line 101 (FIG. 8A). Performing one or both of the steps 122 and 123 may be sufficient for some applications but it is generally desired to obtain a more precise measurement of the material removed. Therefore, the data is subjected, in a step 124, to a known curve fitting algorithm of some type, such as the well known least squares algorithm. This allows the measurement to be resolved to something much smaller than is possible by only counting the peaks and/or valleys, or zero crossings, alone. The counting step 122 can even be omitted, when certain curve fitting techniques are used in the step 124, but may be used in conjunction with other curve fitting techniques in order to reduce the amount of the processing involved. In either case, as indicated by a step 125, a quantity is outputted to show how good the curve fits the data. This provides the operator with an indication of how closely the data followed the curve to which it was fit.

A next step 126 determines from the fit curve the rate of removal of material. This is related to the frequency of the intensity oscillation of FIG. 8A, which can be directly determined. The removal rate is presented as an output in a step 127. Since this is done for each of the sensors, the uniformity of the removal rate may also be calculated in the step 126 and provided as an output in the step 127, either for information or to control the CMP process equipment.

In a step 128, the thickness of material that has been removed from the layer 48 is determined by multiplying the removal rate determined in the step 126 by the amount of time that has elapsed during the process. If the initial film thickness was inputted by the operator in the step 116, the step 128 also calculates and outputs the remaining thickness of the film at the location of each of the sensor units 24a–d. These quantities can be presented as an output, as indicated by the step 129.

The results of the calculations of steps 126–129 can be continuously provided. That is, a new quantities of the amount of material removed, the rate of removal, etc., can be obtained as often as once for each increment of time elapsing between the calculations indicated by the steps 118–128. This allows any necessary adjustments to be instantaneously made in the CMP process.

The steps 118–128 are performed separately for each of the sensor units 24a–d. In a step 130, it is determined whether any one of the sensor units has detected for the first time that the target amount of material, entered by the operator in the step 116, has been removed from the film 48.

If not, the processing returns to the step 118. If so, in a step 131, the time of the processing to reach that point is measured and presented as an output.

In a step 132, it is determined whether a certain number M of a total N number of sensors has reached that point of the processing. If so, it is determined that an endpoint of the process has been reached. If endpoint is not determined by the step 132, the calculation steps 118–128 are repeated again.

A next step 133 calculates the amount of time it took each of the sensor units 24a–d to reach endpoint, and a statistical variation of those times as an indication of the uniformity of the process across the surface of the layer 48, similar to the step 110 of FIG. 12. In addition, as part of the step 133, the minimum and maximum thickness of the processed film 48 is desirably calculated from the individual sensor data. Further, an average rate of material removal may be calculated for the areas monitored by each of the sensing units 24a–d from the time and thickness measurements, and a statistical indication of any removal rate variations incurred during the processing may also be calculated. This is similar to calculations included in the steps 126 and 128 but give overall quantities for the process just concluded. These calculated quantities are outputted in a step 134, and an indication that endpoint of the processing has been reached is outputted in a step 136.

Although the present invention has been described with respect to its preferred embodiments, it should be understood that the invention is entitled to protection within the full scope of the appended claims.

It is claimed:

1. In an apparatus for processing an article by chemical-mechanical-polishing wherein the article is contacted by a moving element, a system for monitoring said processing, comprising:

means including a detector carried by said moving element for receiving a first radiation signal from said article and generate a local signal providing information of the state of the processing of the article by chemical-mechanical-polishing, means carried by said moving element for generating from said local signal a second radiation signal that is transmitted without use of physical transmission media connected thereto, said second radiation signal containing the information of the state of the processing of the article by chemical-mechanical-polishing, and means separated from the moving element for receiving said second radiation signal in order to determine the state of the processing of the article by chemical-mechanical-polishing.

2. The monitoring system of claim 1 wherein the moving element is adapted to hold a substrate carrying a partially formed integrated circuit structure.

3. The monitoring system of claim 1, additionally comprising means for directing against said article a beam of optical radiation that forms the radiation signal received from the article by the detector, and wherein said radiation signal transmitting means includes means for directing optical radiation toward the receiving means.

4. The monitoring system of claim 3 wherein the radiation beam directing means includes means for reflecting, from a surface layer being processed on the article, the optical radiation.

5. The monitoring system of claim 1 wherein said receiving means includes means for determining an endpoint of the processing from said radiation signal.

6. The monitoring system of claim 1 wherein said radiation signal receiving means is arranged so as not to move with either the article or the moving element.

7. In an apparatus for processing a front side of an article, wherein the apparatus includes a moving carrier that holds a backside of the article across a given surface, a system for monitoring the processing, comprising:

means mounted to said carrier and moving therewith for directing interrogating radiation to said surface and receiving a portion of said radiation by reflection when an article is held thereat, said radiation containing information of the state of the processing of the front side of the article, means mounted to said carrier and receiving said article reflected radiation for generating a wireless radiation signal therefrom and transmitting the wireless radiation signal without use of physical transmission media connected to the carrier, said wireless radiation signal carrying said information from the reflected radiation of the state of the processing of the front side of the article, and means positioned off of said carrier and receiving said wireless radiation signal for determining the state of the processing of the front side of the article.

8. The monitoring system of claim 7 which comprises an article held by the carrier with its backside across said surface, and wherein the interrogating radiation of said radiation directing and receiving means passes through the article to a front side thereof in a manner to obtain radiation reflected from the article front side that contains information of the state of the processing of the article front side.

9. The monitoring system of claim 8 wherein said article is a semiconductor wafer.

10. The monitoring system of claim 9 wherein the apparatus is characterized by processing a surface of the wafer by chemical-mechanical-polishing.

11. The monitoring system of claim 9 wherein said article is a flat panel display.

12. The monitoring system of claim 11 wherein the apparatus is characterized by processing a surface of the flat panel display by chemical-mechanical-polishing.

13. The monitoring system of claim 7 wherein the radiation directing means includes means for directing a beam of optical radiation to said surface, and the wireless signal transmitting means includes means for directing another beam of optical radiation toward the state determining means.

14. The monitoring system of claim 7 wherein said state determining means includes means for determining an endpoint of the processing from said wireless radiation signal.

15. The monitoring system of claim 7 wherein said interrogating radiation directing and receiving means includes means for directing two or more beams of interrogating radiation against two or more spaced apart regions of the surface and independently receiving a portion of said radiation from said spaced apart regions by reflection, whereby the processing is independently monitored at said spaced apart regions.

16. The monitoring system of claim 7 wherein said interrogating radiation directing and receiving means includes:

a source of said interrogating radiation and a photodetector mounted to the carrier in a position removed from a surface against which said article is held, an opening extending into the carrier from its said surface against which the article is held, a first optical fiber extending from the radiation source and through the carrier opening in a manner to illuminate the backside of the article from an end of the first optical fiber, and a second optical fiber extending from the photodetector and through the carrier opening in a manner to receive radiation reflected from the article through an end of the second optical fiber.

17. The monitoring system of claim 16 wherein said interrogating radiation directing and receiving means additionally includes a removable sealing device fit into the carrier opening against said one end of the first and second optical fibers.

18. The monitoring system of claim 7 wherein the state determining means includes means for determining a breakthrough in an opaque reflective layer being removed from the article by the processing in advance of the breakthrough occurring.

19. The monitoring system of claim 18 wherein the state determining means additionally includes means for calculating a rate of change of the radiation reflected from the opaque reflective layer and for identifying a characteristic of the derivative that is representative of the reflected radiation changing in intensity level.

20. The monitoring system of claim 18 wherein the state determining means additionally includes means for calculating a mathematical logarithm of the radiation reflected from the opaque reflective layer and for identifying a characteristic of the logarithm that is representative of the reflected radiation changing in intensity level.

21. The monitoring system of claim 18 wherein the state determining means additionally includes means for detecting a drop in the magnitude of the reflected radiation in excess of a predetermined amount.

22. The monitoring system of claim 18 wherein the state determining means additionally includes means for determining an extent of uniformity of the removal of material across the front side of the article.

23. The monitoring system of claim 18 which additionally comprises means responsive to the advance determination of the breakthrough for controlling operation of the processing apparatus.

24. The monitoring system of claim 7 wherein the state determining means includes means for monitoring a signal resulting from an interference between interrogating radiation reflected from the front side of the article being processed and a surface within the article that is not being processed.

25. The monitoring system of claim 24 wherein the signal monitoring means includes means for fitting a curve to the interference signal.

26. The monitoring system of claim 25 wherein the signal monitoring means additionally includes means for repetitively calculating a rate at which material has been removed from the front side of the article.

27. The monitoring system of claim 26 wherein the signal monitoring means additionally includes means for repetitively calculating an amount of material that has been removed from the front side of the article.

28. The monitoring system of claim 24 wherein the signal monitoring means additionally includes means for determining an extent of uniformity of the removal of material across the front side of the article.

29. The monitoring system of claim 24 wherein the signal monitoring means includes means for repetitively calculating the state of the processing of the article and using the results of the calculations to control operation of the processing apparatus.

30. The monitoring system of claim 7 wherein the state determining means includes means for determining a breakthrough in a transparent layer being removed from the article by the processing in advance of the breakthrough occurring.

31. The monitoring system of claim 7 wherein the wireless signal transmitting means includes means for directing a radio frequency signal toward the state determining means.

32. The monitoring system of any one of claims 7–15, wherein the processing apparatus is characterized by processing a front side of an article by removing material therefrom, and the means for determining the state of the processing includes means for determining the state of material removal from the front side of the article.

33. In an apparatus for chemical-mechanical-polishing a film on a substrate contacted by a moving element, a system for monitoring a thickness of the film during the chemical-mechanical-polishing, comprising:

at least one sensor attached to the moving element and which provides at least one local signal with information of the film thickness during the chemical-mechanical-polishing of the film, a controller positioned outside of the processing chamber to detect the film thickness information of said at least one local signal, and a communication link of said information between the sensor and controller including a radiation signal formed from said at least one local signal and having a portion of the communication link without any physical transmission media carrying the radiation signal containing the information of the film thickness being monitored.

34. The apparatus of claim 33, wherein the moving element is adapted to hold a backside of a semiconductor wafer with the film being processed on an exposed front side of the wafer.

35. The apparatus of claim 34, wherein the sensor optically communicates through the backside of the wafer held by the moving element to obtain the film thickness information.

36. The apparatus of claim 33, wherein the moving element is adapted to hold a backside of a flat panel display with the film being processed on an exposed front side of the flat panel display.

37. The apparatus of claim 36, wherein the sensor optically communicates through the backside of the flat panel display held by the moving element to obtain the film thickness information.

38. The apparatus of claim 33, wherein said at least one sensor includes two or more sensors positioned at spaced apart locations across the moving element to provide respective two or more local signals with information of the film thickness being monitored at said locations, and the controller detects these film thicknesses from said information.

39. The apparatus of claim 33, additionally comprising means responsive to the detected film thickness information of the controller for controlling operation of the chemical-mechanical-polishing apparatus.

40. The apparatus of claim 33, wherein the communication link portion without any physical transmission media carrying the signal includes a transmitter of optical radiation.

41. A system for monitoring chemical-mechanical-processing of a front side of an article in an apparatus that includes a carrier with a given surface to hold a backside of the article thereagainst and a motor source that moves the carrier given surface with respect to an abrasive media with which the front side of an article is placed in contact when the article is held by the given surface, said system comprising:

a source of radiation mounted to said carrier that directs interrogating radiation through said carrier to said given surface and through an article held thereby, a detector mounted to said carrier to receive a portion of said radiation reflected from an area of the front side of an article held by said given surface, thereby to obtain information of the state of chemical-mechanical-processing taking place on the article front side, a transmitter that is mounted to said carrier and receives a signal from the detector to generate a wireless radiation signal therefrom that carries said information, and a receiver separated from said carrier and receiving said wireless radiation signal without use of any physical transmission media therebetween that determines the state of the chemical-mechanical-processing of the front side of the article.

42. The monitoring system of claim 41, wherein the radiation source includes a first optical fiber extending through the carrier, and the detector includes a second optical fiber extending through the carrier.

43. A system for monitoring chemical-mechanical-processing of an article in an apparatus that includes a carrier with a given surface to hold a backside of the article thereagainst and a motor source that moves the carrier given surface with respect to an abrasive media with which the article is placed in contact when the article is held by the given surface, said system comprising:

a source of radiation mounted to said carrier that directs interrogating radiation through said carrier to said given surface and onto an article held thereby in at least first and second areas thereof, first detector mounted to said carrier to receive a portion of said radiation reflected from the first area of the article held by said given surface, thereby to obtain information of the state of chemical-mechanical-processing taking place in the first area of the article, a second detector mounted to said carrier to receive a portion of said radiation reflected from the second area of the article held by said given surface, thereby to obtain information of the state of chemical-mechanical-processing taking place in the second area of the article, a transmitter that is mounted to said carrier and receives signals from the first and second detectors to generate a wireless radiation signal therefrom that carries the information of the states of chemical-mechanical-processing taking place in the first and second areas of the article, and a receiver separated from said carrier and receiving said wireless radiation signal without use of any physical transmission media therebetween that determines the state of the chemical-mechanical-processing of the first and second areas of the article.

44. The monitoring system of claim 43, wherein the radiation source includes a first optical fiber extending through the carrier to the first area and a second optical fiber extending through the carrier to the second area, and the first detector includes a third optical fiber extending through the carrier to the first area, and the second detector includes a fourth optical fiber extending through the carrier to the second area.

* * * * *